United States Patent [19]

Toenjes et al.

[11] Patent Number: 5,102,580

[45] Date of Patent: Apr. 7, 1992

[54] DEMULSIFIER COMPOSITIONS AND DEMULSIFYING USE THEREOF

[75] Inventors: Anthony A. Toenjes, Belleville, Ill.; Mark R. Williams; Elizabeth A. Goad, both of St. Louis, Mo.

[73] Assignee: Petrolite Corporation, St. Louis, Mo.

[21] Appl. No.: 705,839

[22] Filed: May 28, 1991

[51] Int. Cl.$^5$ .............................................. B01D 17/04
[52] U.S. Cl. .................................... 252/334; 252/331; 252/333; 252/344; 252/358; 525/530
[58] Field of Search ............... 252/358, 344, 333, 334; 525/530

[56] References Cited

U.S. PATENT DOCUMENTS

| | | | |
|---|---|---|---|
| 3,511,882 | 5/1970 | Seale et al. | 260/613 |
| 4,098,717 | 7/1978 | Buriks et al. | 252/331 |
| 4,120,815 | 10/1978 | Raman | 252/341 |
| 4,326,968 | 4/1982 | Blair, Jr. | 252/8.55 D |
| 4,448,708 | 5/1984 | Killat et al. | 252/344 |
| 4,626,379 | 12/1986 | Buriks et al. | 252/340 |
| 4,877,842 | 10/1989 | Buriks et al. | 252/344 |

Primary Examiner—Richard D. Lovering
Assistant Examiner—N. Bhat
Attorney, Agent, or Firm—Stanley M. Tarter

[57] ABSTRACT

A blend of a first block oxyalkylated copolymer of a bishydroxyalkyl ether and a second block oxyalkylated copolymer of 2-amino-2-hydroxymethyl 1,3-propanediol partially cross-linked with a vinyl polymer in the pH reducing presence of an alkylsulfonic acid is provided and can be used as an effective demulsifier.

20 Claims, No Drawings

DEMULSIFIER COMPOSITIONS AND DEMULSIFYING USE THEREOF

BACKGROUND OF THE INVENTION

1. Field of the Invention

This invention relates to novel demulsifier compositions and to methods of using such compositions to demulsify. More particularly, the invention relates to novel demulsifying agents for use in processes adapted for preventing, breaking or resolving emulsions of the water-in-oil type, particularly petroleum emulsions and emulsions of water obtained in crude oil production.

2. Prior Art

A wide variety of oxyalkylated compounds are known to be demulsifiers for the resolution of water-in-oil emulsions. For example, it is well-known that effective demulsifiers can be prepared by condensation of diglycidyl ethers with polyoxylated glycols. U.S. Pat. Nos. 2,792,352; 2,792,353; 2,792,354; 2,792,355; 2,792,356; and 2,792,357 disclose that such demulsifiers are useful to resolve crude oil emulsions.

In U.S. Pat. No. 3,511,882, blends of oxyalkylated compounds and oxyalkylated adducts of phenol-formaldehyde resins, polyalkylene polyamines and the like are disclosed as being effective demulsifiers.

In U.S. Pat. No. 4,626,379 there is disclosed a now commercial demulsifier which comprises the partially condensed reaction product of a blend of at least two oxyalkylated materials with a vinyl monomer. Such oxyalkylated materials are, for example, polyoxyalkylene glycols, oxyalkylated phenolic resins and oxyalkylated polyamines. The disclosed vinyl monomers include acrylic and methacrylic acids and their esters, such as vinyl formate, vinyl acetate, vinyl propionate and the like, acrylonitrile, styrene and other vinyl aromatics, such as vinyl pyridine, vinyl pyrollidone, acrylamide, maleic anhydride and their esters, half esters and the like.

In U.S. Pat. No. 4,877,842 is disclosed a demulsifying composition comprising the reaction product resulting from subjecting to grafting reaction conditions a mixture comprising a solvent, a polyoxyalkylene amine and a vinyl monomer to produce a grafted intermediate and subjecting said grafted intermediate to esterification is partially cross-linked.

Despite the fact that many demulsifiers have been disclosed for resolving water-in-oil emulsions, the oil processing and servicing industries are continually looking for more effective demulsifiers, ones that will demulsify a given emulsion at reduced dosages and/or ones that are more economical to produce and use.

An objective of the present invention is to provide novel, more cost effective demulsifiers.

SUMMARY OF THE INVENTION

The present invention provides a new and useful demulsifier composition. The composition is a blend of (1) a propoxylated-ethoxylated block copolymer of a bishydroxyalkyl ether and (2) a propoxylated-ethoxylated block copolymer of 2-hydroxymethyl-1,3-propanediol, said blend being partially cross-linked with a vinyl monomer when dissolved in an organic aprotic solvent and having a pH of about 5 or lower.

The first block copolymer is prepared by first polycondensing a bishydroxyalkyl ether, such as dipropylene glycol, diethylglycol and the like, with propylene oxide in accordance with the following equation:

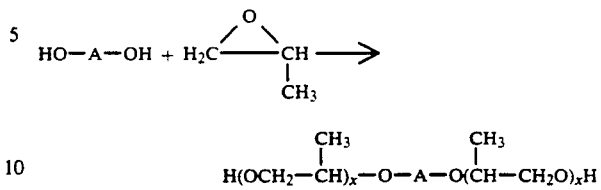

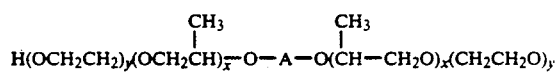

wherein x is an integer of about 25 to 125, preferably 50 to 75, and A is a residue of a bishydroxyalkyl ether, such as dimethylene glycol and the like. Next, the resulting propoxylated diol is reacted with ethylene oxide to produce a block copolymer having the structure:

$$H(OCH_2CH_2)_y(OCH_2CH)_x-O-A-O(CH-CH_2O)_x(CH_2CH_2O)_y$$
$$\quad\quad\quad\quad\quad\quad CH_3 \quad\quad\quad\quad\quad CH_3$$

wherein y is integer of about 1 to 50, preferably 15 to 35.

The second copolymer of the blend of copolymers is prepared by first polycondensing 2-amino-2-hydroxymethyl-1,3-propanediol, commonly known as TRIS, with propylene oxide to provide a polymer having about 5 to 50 oxypropylene units, preferably 10 to 25.

Next, the propoxylated diol is reacted with ethylene oxide to produce the block copolymer having about 3 to 15 ethylene oxide units, preferably 5 to 10.

The two block copolymers are dissolved together in an organic aprotic solvent, such as toluene, xylene, trialkybenzene, cyclohexane, heptane, hexane, etc., mixtures thereof and the like.

To the solution a sufficient amount of a mono- or di-substituted alkyl benzene sulfonic acid is added to reduce the pH of the solution of the two block copolymers. The pH of the solution should be no more than about 5. A strong mineral acid, such as hydrochloric acid, may be added in a suitable amount to achieve further lowering of the pH of the solution, if desired. Into the resulting acidified solution containing the blend of the two block copolymers a vinyl monomer, such as acrylic acid, methacrylic acid, esters product is subjected to cross-linking conditions preferably in the presence of a catalytic amount of a free radical catalyst to partially cross-link the block copolymers.

The amount of block copolymer to the vinyl monomer is in the range of about 5-15% on a weight basis, preferably in the range of 10-13%.

The amount of solvent may vary but should be at least sufficient to dissolve the blend of the block copolymers prior to the cross-linking.

DETAILED DESCRIPTION OF THE INVENTION

In this specification and claims, numerical values are not critical unless otherwise stated. That is, the numerical values may be read as if they were prefaced with the word "about" or "substantially".

In accordance with the present invention, certain new and useful compositions have been discovered which have increased activity in demulsifying water-in-oil emulsions. More specifically, it has been discovered that a very effective demulsifying agent may be formed by lowering the pH of an organic solution of a blend of certain block copolymers with a mono- or di-alkyl substituted benzene sulfonic acid to a pH of about 5 or less. The first copolymer is a block copolymer of a bishydroxalkyl ether and propylene oxide and ethylene oxide in that order. The second copolymer is a block copolymer of 2-amino-2-hydroxymethyl-1,3-propanediol and propylene oxide and ethylene oxide in that order. The two block copolymers are thereafter partially cross-linked with a vinyl monomer.

The two oxyalkylated block copolymers used in the preparation of the demulsifier of the present invention may be prepared by conventional oxyalkylation processes. As a first oxyalkylated block copolymer a bishydroxyalkyl ether is first reacted with propylene oxide. For each mole of ether, a range of about 25 to 125 moles of propylene oxide is used. For example, to an autoclave equipped with means for stirring the contents therein and jacketed for heating and pressurizing the contents therein, a preselected amount of the bishydroxyalkyl ether as defined above, such as dipropylene glycol and a catalytic amount of a base catalyst, such as sodium hydroxide or potassium hydroxide are charged. The contents of the autoclave are heated to a suitable reaction temperature, such as 100-150° C. At this temperature, the propylene oxide is slowly introduced from a pressurized container in an amount sufficient to propoxylate the ether to a predetermined extent. Suitable pressure and temperature conditions are maintained in the autoclave to insure that unreacted propylene oxide is at a minimum. After completion of the reaction between the ether and propylene oxide, ethylene oxide is slowly introduced into the autoclave from a pressurized container in an amount to ethoxylate the propoxylated ether to a predetermined extent. Suitable pressure and temperature conditions are used to insure that unreacted ethylene oxide is at a minimum. After completion of the oxyethylation, the contents of the autoclave are cooled. For each mole of the ether, a range of 1 to 50 moles of ethylene oxide is used.

As a second oxyalkylated block copolymer 2-amino-2-hydroxymethyl-1,3-propanediol is reacted with propylene oxide. For each mole of the diol, a range of about 5 to 50 moles of propylene oxide is used. For example, to an autoclave as above described, a preselected amount of the diol and a catalytic amount of a base catalyst, such as sodium hydroxide or potassium hydroxide are charged. The contents of the autoclave are heated to a suitable reaction temperature, such as 100-150° C. At this temperature, the propylene oxide is slowly introduced from a pressurized container in an amount to propoxylate the diol to a predetermined extent. Suitable pressure and temperature conditions are maintained in the autoclave to ensure that unreacted propylene oxide is at a minimum. After completion of the reaction between the diol and propylene oxide, ethylene oxide is slowly introduced into the autoclave from a pressurized container in an amount to ethoxylate the propoxylated diol to a predetermined extent. Suitable pressure and temperature conditions are used to ensure that unreacted ethylene oxide is at a minimum. After completion of the ethoxylation, the contents of the autoclave are cooled. For each mole of diol, a range of 3 to 15 moles of ethylene oxide is used.

The two thus-produced block copolymers are dissolved together in a suitable organic aprotic solvent. The resulting solution is acidified to a pH of 5 or below by the use of a suitable alkylbenzene sulfonic acid alone or in combination with a mineral acid. The sulfonic acid has the following structural formula:

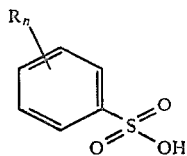

wherein R is a $C_1$-$C_{14}$ alkyl and n is an integer of 1 or 2.

The blend of the two oxyalkylated block copolymers in the acidified solution is partially cross-linked using a vinyl monomer. The vinyl monomer for use in preparing the demulsifier compositions of the present invention may free radical conditions, will co-react with the blend of oxyalkylated copolymers with loss of its vinyl unsaturation and/or will introduce active sites which play a role during the subsequent partial condensation reaction and improve the demulsifying activity of the final product as a water-in-oil demulsifier.

Examples of vinyl monomers which may be used in the present invention include acrylic and methacrylic acids and their esters, vinyl esters such as vinyl formate, vinyl acetate, vinyl propionate and the like, acrylonitrile, styrene and other vinyl aromatics, vinyl pyridine, vinyl pyrollidone, acrylamide, maleic anhydride and its esters and half esters and the like. In general, the vinyl monomer may be any suitable unsaturated compound capable of free radical polymerization and co-reaction with blends of the oxyalkylated block copolymers. Preferred vinyl monomers include acrylic acid and methacrylic acid.

Addition of the vinyl monomer to the blend of oxyalkylated block copolymers in the organic solution under suitable reaction conditions results in the cross-linked demulsifier product of the present invention. Free radical catalysts which are useful in the cross-linking reaction include azo and inorganic and organic peroxide initiators, such as hydrogen peroxide, dilauroyl peroxide, t-butyl peroxide, 2,2-di(butyl peroxy)butane, dicumyl peroxide, 2,2-azobis(2-methyl propionitrile), 2-butylazo-2-cyanobutane, 4(t-butylperoxycarbonyl)-3-hexyl-6-(7-[t-butylperoxycarbonyl]heptyl)cyclohexane and the like. Preferred catalysts include dibenzoyl peroxide, diacetyl peroxide, dilauroyl peroxide, t-butyl perbenzoate, t-amylperoclanoate, dicumyl peroxide and the like. In general, the preferred catalysts are organic peroxides which decompose between about 50° and 140° C and function to induce cross-linking. The catalyst may comprise from about 2 to about 40% by weight of the added vinyl monomer. The temperature of the reaction may be from about 40° to 140° C., preferably from about 60° to 120° C., especially from about 80° to about 100° C.. The reaction may be conducted in bulk or in solution over a period of time of from about 2 to about 10 hours. The reaction between the blend of the two block copolymers and the vinyl monomer reactant is generally continued until the presence of monomer is no longer detected.

The intermediate product formed by the reaction of the oxyalkylated block copolymer mixture and the vinyl monomer reactant is subjected to partial condensation under elevated temperature conditions. In general, the partial condensation is carried out at about pH 5 or less and a temperature of from about 100° to about 200° C.. Preferably, a temperature of 150° to 170° C. is desired. The condensation may be conducted over a period of from about 6 to about 30 hours, preferably from about 8 to about 20 hours, especially from about 12 to about 16 hours. The optimum time period of the reaction will vary depending on pH and the specific other reaction conditions and reactants used.

The product formed by co-reacting the benzene sulfonate acidified blend of the two oxyalkylated block copolymers with a vinyl monomer followed by subsequent partial condensation affords demulsifier compositions which have substantially enhanced demulsifying activity.

The following working examples are merely illustrative of the invention which is not limited thereto. Unless otherwise indicated, all weights and percentages are on a weight basis.

EXAMPLE 1

One mole of 2-amino-2-hydroxymethyl-1,3-propanediol was polycondensed with 38 moles propylene oxide; and, thereafter the resulting intermediate polymer was polycondensed with 12 moles of ethylene oxide to prepare the first oxyalkylated block copolymer. One mole of dipropylene glycol was polycondensed with 55 moles propylene oxide; and, thereafter the resulting intermediate polymer was polycondensed with 18 moles of ethylene oxide to prepare the second oxyalkylated block copolymer. In each polycondensation, sodium hydroxide was the employed catalyst.

Into a pot, 19.0 grams of the first block copolymer and 73.0 grams of the second block copolymer were charged along with 192 grams of trimethylbenzene solvent. An amount of 1.2 grams of dodecylbenzene sulfonic acid and a sufficient amount of hydrochloric acid were added to the solution in the pot to provide a final pH of 3.2. The contents in the pot were stirred and heated at 125° C. under nitrogen for one-half hour and then cooled to room temperature. To the cooled reaction mixture, 12.9 grams of glacial acrylic acid and 1.0 gram of t-butyl perbenzoate catalyst was added. Thereafter, the contents of the pot was heated slowly to 90-95° C. under nitrogen and held at this temperature for 5 hours and was subsequently heated to 160-165° C. and held at this higher temperature for 12 hours.

The activity of the demulsifier prepared by this example was tested against the activity of a related commercial oilfield demulsifier prepared in accordance with U.S. Pat. No. 4,502,977 and sold by Petrolite Corporation under the designation of TRETOLITE ® RP-799, using the standard bottle testing of crude oil emulsions, the procedure of which is conducted as follows:

Fresh samples of the emulsion breaking chemicals in organic solvent solution ar prepared containing 10% active ingredient. Test solutions are made by accurately diluting the same so that a range of 10–60 ppm active can be added to demulsify 100 ml of oilfield water-in-oil emulsions. The emulsion and a selected aliquot of demulsifier mixture are agitated well until the emulsion breaking chemical is completely dissolved in the emulsion.

The equipment for running the crude oil emulsion breaking test includes a set of 6 oz graduated prescription bottles, a funnel, a graduated 0.2 ml pipette, a thief pipette, a centrifuge, centrifuge tubes, a thermometer and a heated water bath. The graduated prescription bottles are filled to the 100 ml mark with the crude oil emulsion to be tested. If there is any free water in the crude oil emulsion sample, it is bled off before the bottles are filled. Each bottle is inverted so that the bottle will be coated with a film of the emulsion.

By use of the 0.2 ml pipette, the prescribed volume of the 10% solution of the emulsion breaking chemical is added to the emulsion in the bottles. The bottles are then capped and given manual agitation for a predetermined number of shakes. If the emulsion requires heat for treatment, the bottles are placed in a hot water bath, the length of time and temperature being determined by the particular plant equipment and practices in which the particular emulsion is employed.

The bottles are then removed from the hot water bath and; the presence of separated water, color and general appearance of the oil are noted.

A thief gradient is taken on all bottles which appear to be promising. A thief gradient is made by preparing centrifuge tubes filled with xylene to the 50% mark. The thief pipette is set to the proper length by adjusting the rubber stopper so that the bottom of the of the bottle with maximum water drop. The same setting is used for all subsequent thievings. The thieved to the 100% mark, and the tube is shaken. The samples are then centrifuged for three minutes.

An excess chemical grindout is then run on each centrifuge by adding several drops of a 20% solution in xylene. Each tube is vigorously shaken to ensure that the basic sediment (BS) layer is broken up. The samples are then centrifuged for a second three minute period.

The thief grindout and excess chemical grindout readings indicate the demulsifier that has most nearly produced crude oil free from BS and water.

The following is a series of samples of test results obtained by bottle testing the materials of this invention and comparing their effectiveness with TRETOLITE ® RP-799, hereinafter "−799".

In the test of Table 1, the emulsion was obtained from Shell's Cedar Creek, Baker Montana Oilfield Lease which had a determined water content of 76.0% and an oil content of 24%. The manual agitation was 400 shakes at 92° C.. After the 30 minute reading, the bottles were inverted five times to enhance coalescence of water.

TABLE 1

| Active | Dose, ppm | Setting Time Minutes/% Water | | | | | Top Cut % H₂O | Top Cut % BS |
|---|---|---|---|---|---|---|---|---|
| −799 | 60 | 10/10 | 20/55 | 30/75 | 40/75 | 70/75 | 0.1 | 0.3 |
| Ex. 1 | 60 | 10/72 | 20/75 | 30/75 | 40/70 | 70/73 | 0.0 | 0.2 |
| −799 | 50 | 10/20 | 20/65 | 30/72 | 40/75 | 70/75 | 0.2 | 0.4 |
| Ex. 1 | 50 | 10/75 | 20/75 | 30/75 | 40/75 | 70/75 | 0.0 | 0.3 |
| −799 | 40 | 10/05 | 20/10 | 30/20 | 40/20 | 70/75 | 0.2 | 0.4 |
| Ex. 1 | 40 | 10/70 | 20/75 | 30/75 | 40/75 | 70/75 | trace | 0.2 |
| −799 | 30 | 10/02 | 20/02 | 30/03 | 40/08 | 70/25 | 16.0 | 2.0 |
| Ex. 1 | 30 | 10/65 | 20/75 | 30/75 | 40/75 | 70/75 | 0.05 | 0.4 |
| −799 | 20 | 10/01 | 20/01 | 30/02 | 40/04 | 70/08 | 10.0 | 22.0 |
| Ex. 1 | 20 | 10/28 | 20/60 | 30/65 | 40/70 | 70/75 | trace | 1.2 |

As can be noted from the above data, the demulsifier of this Example is more effective than the commercial demulsifier against which it was tested. For example, at a dosage of 60 ppm after only ten minutes, 72 parts out of a possible 76 parts of water were removed from the emulsion by using the demulsifier of this Example. At the same dosage using the commercial emulsifier only 10 parts out of a possible 76 parts of water were removed from the emulsion during the same period of time.

EXAMPLES 2-18

A series of cross-linked block copolymers was prepared as in Example 1 except that the amounts of propylene oxide and ethylene oxide used in preparing each of the polymers in the blend of polymers were varied. In Table 2, the percent of alkylene oxides used in these examples as compared with the amount of alkylene oxides used in Example 1 is given.

TABLE 2

| Example Number | First Polymer % PO | First Polymer % EO | Second Polymer % PO | Second Polymer % EO |
|---|---|---|---|---|
| 2 | 90 | 110 | 110 | 110 |
| 3 | 90 | 110 | 110 | 90 |
| 4 | 90 | 90 | 110 | 90 |
| 5 | 90 | 90 | 110 | 110 |
| 6 | 110 | 110 | 90 | 90 |
| 7 | 90 | 110 | 90 | 90 |
| 8 | 100 | 100 | 100 | 100 |
| 9 | 110 | 90 | 110 | 110 |
| 10 | 90 | 90 | 90 | 90 |
| 11 | 110 | 90 | 110 | 90 |
| 12 | 110 | 110 | 110 | 110 |
| 13 | 90 | 110 | 90 | 110 |
| 14 | 110 | 110 | 110 | 90 |
| 15 | 110 | 110 | 90 | 110 |
| 16 | 90 | 90 | 90 | 110 |
| 17 | 100 | 90 | 90 | 110 |
| 18 | 100 | 90 | 90 | 90 |

Each of the cross-linked copolymers was tested for demulsifier effectiveness using the above-described bottle shake testing procedure. The results of such testing are set out in Table 3. The emulsion was obtained from the same field as the emulsion in Example 1 but at a significantly later time. The dosage of each test was 50 ppm active. The bottles were given 300 shakes over a period of three minutes. Settling data are set out in Table 3.

TABLE 3

| Example Number | Settling Data Minutes/% Water | | | Top Cut % BS |
|---|---|---|---|---|
| 2 | 15/10 | 30/40 | 60/52 | 0.2 |
| 3 | 15/07 | 30/20 | 60/48 | 0.3 |
| 4 | 15/05 | 30/15 | 60/43 | 0.4 |
| 5 | 15/10 | 30/20 | 60/40 | 0.3 |
| 6 | 15/07 | 30/12 | 60/23 | 0.2 |
| 7 | 15/10 | 30/15 | 60/45 | 0.1 |
| 8 | 15/10 | 30/30 | 60/50 | 0.2 |
| 9 | 15/15 | 30/20 | 60/43 | 0.2 |
| 10 | 15/07 | 30/30 | 60/45 | 0.4 |
| 11 | 15/07 | 30/12 | 60/43 | 0.3 |
| 12 | 15/07 | 30/15 | 60/43 | 0.2 |
| 13 | 15/03 | 21/08 | 60/30 | 0.2 |
| 14 | 15/12 | 30/18 | 60/40 | 0.4 |
| 15 | 15/05 | 30/10 | 60/25 | 0.2 |
| 16 | 15/05 | 30/12 | 60/32 | 0.2 |
| 17 | 15/03 | 30/15 | 60/30 | 0.2 |
| 18 | 15/10 | 30/13 | 60/30 | 0.3 |

It is to be understood that the foregoing detailed description is given merely by way of illustration and that many modifications may be made therein without departing from the spirit of scope of the present invention.

What is claimed is:

1. A method of demulsifying a water-in-oil emulsion comprising adding thereto a demulsifying amount of a composition comprising a blend of a first block oxyalkylated copolymer of a bishydroxyalkyl ether and a second block oxyalkylated copolymer of 2-amino-2-hydroxymethyl-1,3-propanediol partially cross-linked with a vinyl monomer in the pH reducing presence of an alkysulfonic acid.

2. A method of demulsifying a water-in-oil emulsion comprising adding thereto a demulsifying amount of a composition comprising a blend of a first block copolymer of a bishydroxy $C_2$-$C_4$ alkyl ether having been first oxypropylated with 25-125 units of propylene oxide and then oxyethylated with 1-50 units of ethylene oxide and a second block copolymer of 2-amino-2-hydroxymethyl- 1,3-propanediol having been first oxypropylated with 5-50 units of propylene oxide and then ethoxylated with 3-15 units of ethylene oxide, said blend of polymers having been partially cross-linked in an organic aprotic solvent with a vinyl monomer in the presence of a $C_1$-$C_{14}$ monoalkyl or a $C_1$-$C_{14}$ dialkyl sulfonic acid and optionally a mineral acid in an amount to provide a pH of the solution of at most about 5.0 during cross-linking.

3. The method of claim 2 wherein the bishydroxyalkyl ether is diethylene glycol or dipropylene glycol.

4. The method of claim 2 wherein the alkyl sulfonic acid is dodecylbenzene sulfonic acid.

5. The method of claim 3 wherein the alkyl sulfonic acid is dodecylbenzene sulfonic acid.

6. The method of claim 2 wherein the vinyl monomer acrylic acid or methacrylic acid.

7. The method of claim 3 wherein the vinyl monomer is acrylic acid or methacrylic acid.

8. The method of claim 4 wherein the vinyl monomer is acrylic acid or methacrylic acid.

9. The method of claim 5 wherein the vinyl monomer is acrylic acid or methacrylic acid.

10. The method of claim 2 wherein hydrochloric acid is used to reduce the pH.

11. A blend of a first block oxyalkylated copolymer of a bishydroxyalkyl ether and a second block oxyalkylated copolymer of 2-amino-2-hydroxymethyl-1,3-propanediol partially cross-linked with a vinyl monomer in the pH reducing presence of an alkylsulfonic acid.

12. A composition of matter comprising a blend of a first block copolymer of a bishydroxy $C_2$-$C_4$ alkyl ether having been first oxypropylated with 25-125 units of propylene oxide and then 1-50 units of ethylene oxide and a second block copolymer of 2-amino-2-hydroxy methyl-1,3-propane diol having been first oxypropylated with 5-50 units of propylene oxide and then with 3-15 units of ethylene oxide, said blend of polymers having been partially cross-linked in an organic aprotic solvent with a vinyl monomer in the presence of a $C_1$-$C_{14}$ monoalkyl or a $C_1$-$C_{14}$ dialkyl sulfonic acid and optionally a mineral acid in an amount to provide a pH of the solution of at most about 5.0 during cross-linking.

13. The composition of claim 12 wherein the bishydroxyalkyl ether is diethylene glycol or dipropylene glycol.

14. The composition of claim 12 wherein the alkyl sulfonic acid is dodecylbenzene sulfonic acid.

15. The composition of claim 13 wherein the alkyl sulfonic acid is dodecylbenzene sulfonic acid.

16. The composition of claim 12 wherein the vinyl monomer is acrylic acid or methacrylic acid.

17. The composition of claim 13 wherein the vinyl monomer is acrylic acid or methacrylic acid.

18. The composition of claim 14 wherein the vinyl monomer is acrylic acid or methacrylic acid.

19. The composition of claim 15 wherein the vinyl monomer is acrylic acid or methacrylic acid.

20. The composition of claim 12 wherein hydrochloric acid is used to reduce the pH.

* * * * *